United States Patent
Bushey et al.

(10) Patent No.: US 7,450,698 B2
(45) Date of Patent: Nov. 11, 2008

(54) SYSTEM AND METHOD OF UTILIZING A HYBRID SEMANTIC MODEL FOR SPEECH RECOGNITION

(75) Inventors: Robert R. Bushey, Cedar Park, TX (US); Benjamin Anthony Knott, Round Rock, TX (US); John Mills Martin, Austin, TX (US)

(73) Assignee: AT&T Intellectual Property 1, L.P., Reno, NV (US)

( * ) Notice: Subject to any disclaimer, the term of this patent is extended or adjusted under 35 U.S.C. 154(b) by 738 days.

(21) Appl. No.: 11/036,204

(22) Filed: Jan. 14, 2005

(65) Prior Publication Data
US 2006/0159240 A1  Jul. 20, 2006

(51) Int. Cl.
*H04M 11/00* (2006.01)

(52) U.S. Cl. .............. 379/88.14; 379/88.01; 379/88.03; 704/270; 704/275

(58) Field of Classification Search .............. 379/88.01, 379/88.19; 704/231, 240, 251
See application file for complete search history.

(56) References Cited

U.S. PATENT DOCUMENTS

| | | | |
|---|---|---|---|
| 4,696,028 A | 9/1987 | Morganstein et al. | |
| 4,788,715 A | 11/1988 | Lee | |
| 4,953,204 A | 8/1990 | Cuschelg, Jr. et al. | |
| 4,964,077 A | 10/1990 | Eisen et al. | |
| 4,967,405 A | 10/1990 | Upp et al. | |
| 5,042,006 A | 8/1991 | Flohrer | |
| 5,235,679 A | 8/1993 | Yoshizawa et al. | |
| 5,335,269 A | 8/1994 | Steinlicht | |
| 5,416,830 A | 5/1995 | MacMillan, Jr. et al. | |
| 5,455,903 A | 10/1995 | Jolissaint et al. | |
| 5,497,373 A | 3/1996 | Hulen et al. | |
| 5,522,046 A | 5/1996 | McMillen et al. | |
| 5,530,744 A | 6/1996 | Charalambous et al. | |
| 5,555,299 A | 9/1996 | Maloney et al. | |

(Continued)

FOREIGN PATENT DOCUMENTS

EP  0 424 015 A2  4/1991

(Continued)

OTHER PUBLICATIONS

U.S. Appl. No. 10/898,722, filed Jul. 23, 2004.

(Continued)

*Primary Examiner*—Fan Tsang
*Assistant Examiner*—Akelaw A Teshale
(74) *Attorney, Agent, or Firm*—Toler Law Group

(57) ABSTRACT

A method for processing a call is disclosed. The method receives a speech input in connection with a call and transforms at least a segment of the speech input into a first textual format. The method also generates a first list of entries based, at least partially, on a consideration of the first textual format, the first list comprising at least one action with a corresponding confidence level and at least one object with another corresponding confidence level, selects an entry of the first list having a higher corresponding confidence level, outputs a second textual format. The method further generates a second list based, at least partially on consideration of the selected entry and the second textual format and suggesting a routing option for the call based on the selected entry and a pairing entry in the second list having a high corresponding confidence level.

18 Claims, 3 Drawing Sheets

U.S. PATENT DOCUMENTS

| | | | |
|---|---|---|---|
| 5,590,186 A | 12/1996 | Liao et al. | |
| 5,632,002 A | 5/1997 | Hashimoto et al. | |
| 5,652,789 A | 7/1997 | Miner et al. | |
| 5,754,639 A | 5/1998 | Flockhart et al. | |
| 5,754,978 A | 5/1998 | Perez-Mendez et al. | |
| 5,923,745 A | 7/1999 | Hurd | |
| 5,940,476 A | 8/1999 | Morganstein et al. | |
| 5,946,388 A | 8/1999 | Walker et al. | |
| 5,953,704 A | 9/1999 | McIlroy et al. | |
| 5,991,756 A | 11/1999 | Wu | |
| 5,995,979 A | 11/1999 | Cochran | |
| 5,999,965 A | 12/1999 | Kelly | |
| 6,002,689 A | 12/1999 | Christie et al. | |
| 6,002,760 A | 12/1999 | Gisby | |
| 6,003,011 A | 12/1999 | Sarin et al. | |
| 6,028,601 A | 2/2000 | Machiraju et al. | |
| 6,038,293 A | 3/2000 | McNerney et al. | |
| 6,038,305 A | 3/2000 | McAllister et al. | |
| 6,049,594 A | 4/2000 | Furman et al. | |
| 6,064,731 A | 5/2000 | Flockhart et al. | |
| 6,118,866 A | 9/2000 | Shtivelman | |
| 6,119,101 A | 9/2000 | Peckover | |
| RE37,001 E | 12/2000 | Morganstein et al. | |
| 6,173,266 B1 | 1/2001 | Marx et al. | |
| 6,173,289 B1 | 1/2001 | Sonderegger et al. | |
| 6,173,399 B1 | 1/2001 | Gilbrech | |
| 6,175,621 B1 | 1/2001 | Begeja | |
| 6,259,786 B1 | 7/2001 | Gisby | |
| 6,269,153 B1 | 7/2001 | Carpenter et al. | |
| 6,317,439 B1 | 11/2001 | Cardona et al. | |
| 6,333,980 B1 | 12/2001 | Hollatz et al. | |
| 6,353,608 B1 | 3/2002 | Cullers et al. | |
| 6,366,658 B1 | 4/2002 | Bjornberg et al. | |
| 6,366,668 B1 | 4/2002 | Borst et al. | |
| 6,381,329 B1 | 4/2002 | Uppaluru et al. | |
| 6,385,584 B1 | 5/2002 | McAllister et al. | |
| 6,389,400 B1 | 5/2002 | Bushey et al. | |
| 6,400,804 B1 | 6/2002 | Bilder | |
| 6,400,996 B1 | 6/2002 | Hoffberg et al. | |
| 6,405,159 B2 | 6/2002 | Bushey et al. | |
| 6,411,687 B1 | 6/2002 | Bohacek et al. | |
| 6,414,966 B1 | 7/2002 | Kulkarni et al. | |
| 6,418,424 B1 | 7/2002 | Hoffberg et al. | |
| 6,421,433 B1 | 7/2002 | Arsenault | |
| 6,434,546 B1 | 8/2002 | Williamowski et al. | |
| 6,442,247 B1 | 8/2002 | Garcia | |
| 6,510,414 B1 | 1/2003 | Chaves | |
| 6,519,562 B1 | 2/2003 | Phillips et al. | |
| 6,526,126 B1 | 2/2003 | Morganstein et al. | |
| 6,529,871 B1 | 3/2003 | Kanevsky et al. | |
| 6,546,087 B2 | 4/2003 | Shaffer et al. | |
| 6,553,112 B2 | 4/2003 | Ishikawa | |
| 6,553,113 B1 | 4/2003 | Dhir et al. | |
| 6,570,967 B2 | 5/2003 | Katz | |
| 6,571,240 B1 | 5/2003 | Ho et al. | |
| 6,574,599 B1 | 6/2003 | Lim et al. | |
| 6,584,180 B2 | 6/2003 | Nemoto | |
| 6,584,191 B1 | 6/2003 | McPartlan et al. | |
| 6,587,556 B1 | 7/2003 | Judkins et al. | |
| 6,598,021 B1 | 7/2003 | Shambaugh et al. | |
| 6,598,136 B1 | 7/2003 | Norrod et al. | |
| 6,600,736 B1 | 7/2003 | Ball et al. | |
| 6,603,854 B1 | 8/2003 | Judkins et al. | |
| 6,614,781 B1 | 9/2003 | Elliott et al. | |
| 6,615,248 B1 | 9/2003 | Smith | |
| 6,631,186 B1 | 10/2003 | Adams et al. | |
| 6,662,163 B1 | 12/2003 | Albayrak et al. | |
| 6,678,360 B1 | 1/2004 | Katz | |
| 6,678,718 B1 | 1/2004 | Khouri et al. | |
| 6,690,788 B1 | 2/2004 | Bauer et al. | |
| 6,694,012 B1 | 2/2004 | Posthuma | |
| 6,697,460 B2 | 2/2004 | Knott et al. | |
| 6,700,972 B1 | 3/2004 | McHugh et al. | |
| 6,704,404 B1 | 3/2004 | Burnett | |
| 6,707,789 B1 | 3/2004 | Arslan et al. | |
| 6,714,631 B1 | 3/2004 | Martin et al. | |
| 6,714,643 B1 | 3/2004 | Gargeya et al. | |
| 6,721,416 B1 | 4/2004 | Farrell | |
| 6,731,722 B2 | 5/2004 | Coffey | |
| 6,738,082 B1 | 5/2004 | Dong et al. | |
| 6,738,473 B1 | 5/2004 | Burg et al. | |
| 6,744,861 B1 | 6/2004 | Pershan et al. | |
| 6,744,877 B1 | 6/2004 | Edwards | |
| 6,751,306 B2 | 6/2004 | Himmel et al. | |
| 6,757,306 B1 | 6/2004 | Klish, II et al. | |
| 6,766,320 B1 | 7/2004 | Wang et al. | |
| 6,775,359 B1 | 8/2004 | Ron et al. | |
| 6,778,643 B1 | 8/2004 | Bushey et al. | |
| 6,792,096 B2 | 9/2004 | Martin et al. | |
| 6,807,274 B2 | 10/2004 | Joseph et al. | |
| 6,823,307 B1 | 11/2004 | Steinbiss et al. | |
| 6,831,932 B1 | 12/2004 | Boyle et al. | |
| 6,832,224 B2 | 12/2004 | Gilmour | |
| 6,842,504 B2 | 1/2005 | Mills et al. | |
| 6,847,711 B2 | 1/2005 | Knott et al. | |
| 6,853,722 B2 | 2/2005 | Joseph et al. | |
| 6,853,966 B2 | 2/2005 | Bushey et al. | |
| 6,859,529 B2 | 2/2005 | Duncan et al. | |
| 6,871,212 B2 | 3/2005 | Khouri et al. | |
| 6,879,683 B1 | 4/2005 | Fain et al. | |
| 6,885,734 B1 | 4/2005 | Eberle et al. | |
| 6,891,932 B2 | 5/2005 | Bhargava et al. | |
| 6,895,083 B1 | 5/2005 | Bers et al. | |
| 6,901,366 B1 | 5/2005 | Kuhn et al. | |
| 6,907,119 B2 | 6/2005 | Case et al. | |
| 6,915,246 B2 | 7/2005 | Gusler et al. | |
| 6,922,689 B2 | 7/2005 | Shtivelman | |
| 6,925,155 B2 | 8/2005 | Reynolds et al. | |
| 6,944,592 B1* | 9/2005 | Pickering | 704/251 |
| 6,963,983 B2 | 11/2005 | Munson et al. | |
| 6,964,023 B2 | 11/2005 | Maes et al. | |
| 6,970,554 B1 | 11/2005 | Peterson et al. | |
| 7,003,079 B1 | 2/2006 | McCarthy et al. | |
| 7,006,605 B1 | 2/2006 | Morganstein et al. | |
| 7,027,975 B1 | 4/2006 | Pazandak et al. | |
| 7,031,444 B2 | 4/2006 | Shen et al. | |
| 7,035,388 B2 | 4/2006 | Kurosaki | |
| 7,039,166 B1 | 5/2006 | Peterson et al. | |
| 7,062,505 B2 | 6/2006 | Lane et al. | |
| 7,072,457 B2 | 7/2006 | Brown et al. | |
| 7,106,850 B2 | 9/2006 | Campbell et al. | |
| 7,142,652 B2 | 11/2006 | Ho | |
| 7,177,792 B2 | 2/2007 | Knight et al. | |
| 7,200,614 B2 | 4/2007 | Reid et al. | |
| 2001/0011211 A1 | 8/2001 | Bushey et al. | |
| 2001/0018672 A1 | 8/2001 | Petters et al. | |
| 2001/0032211 A1 | 10/2001 | Kuzumaki | |
| 2001/0032229 A1 | 10/2001 | Hulls et al. | |
| 2001/0034662 A1 | 10/2001 | Morris | |
| 2002/0046030 A1 | 4/2002 | Haritsa et al. | |
| 2002/0049874 A1 | 4/2002 | Kimura | |
| 2002/0059169 A1 | 5/2002 | Quarterman et al. | |
| 2002/0067714 A1 | 6/2002 | Crain et al. | |
| 2002/0087385 A1 | 7/2002 | Vincent | |
| 2002/0133394 A1 | 9/2002 | Bushey et al. | |
| 2002/0133413 A1 | 9/2002 | Chang et al. | |
| 2002/0156699 A1 | 10/2002 | Gray et al. | |
| 2002/0165732 A1 | 11/2002 | Ezzeddine et al. | |
| 2002/0196277 A1 | 12/2002 | Bushey et al. | |
| 2003/0018659 A1 | 1/2003 | Fuks et al. | |
| 2003/0026409 A1 | 2/2003 | Bushey et al. | |
| 2003/0035381 A1 | 2/2003 | Chen et al. | |
| 2003/0069937 A1 | 4/2003 | Khouri et al. | |
| 2003/0125945 A1* | 7/2003 | Doyle | 704/246 |

| | | |
|---|---|---|
| 2003/0143981 A1 | 7/2003 | Kortum et al. |
| 2003/0144919 A1 | 7/2003 | Trompette et al. |
| 2003/0156133 A1 | 8/2003 | Martin et al. |
| 2003/0187732 A1 | 10/2003 | Seta |
| 2003/0187773 A1 | 10/2003 | Santos et al. |
| 2003/0194063 A1 | 10/2003 | Martin et al. |
| 2003/0202640 A1 | 10/2003 | Knott et al. |
| 2003/0202643 A1 | 10/2003 | Joseph et al. |
| 2003/0202649 A1 | 10/2003 | Haug, Jr. et al. |
| 2003/0204435 A1 | 10/2003 | McQuilkin et al. |
| 2003/0235282 A1 | 12/2003 | Sichelman et al. |
| 2004/0005047 A1 | 1/2004 | Joseph et al. |
| 2004/0006473 A1 | 1/2004 | Mills et al. |
| 2004/0032862 A1 | 2/2004 | Schoeneberger et al. |
| 2004/0032935 A1 | 2/2004 | Mills et al. |
| 2004/0042592 A1 | 3/2004 | Knott et al. |
| 2004/0044950 A1 | 3/2004 | Mills et al. |
| 2004/0066401 A1 | 4/2004 | Bushey et al. |
| 2004/0066416 A1 | 4/2004 | Knott et al. |
| 2004/0073569 A1 | 4/2004 | Knott et al. |
| 2004/0088285 A1 | 5/2004 | Martin et al. |
| 2004/0103017 A1 | 5/2004 | Reed et al. |
| 2004/0109555 A1 | 6/2004 | Williams |
| 2004/0125937 A1 | 7/2004 | Turcan et al. |
| 2004/0125938 A1 | 7/2004 | Turcan et al. |
| 2004/0125940 A1 | 7/2004 | Turcan et al. |
| 2004/0161078 A1 | 8/2004 | Knott et al. |
| 2004/0161094 A1 | 8/2004 | Martin et al. |
| 2004/0161096 A1 | 8/2004 | Knott et al. |
| 2004/0174980 A1 | 9/2004 | Knott et al. |
| 2004/0230438 A1 | 11/2004 | Pasquale et al. |
| 2004/0240635 A1 | 12/2004 | Bushey et al. |
| 2004/0243568 A1 | 12/2004 | Wang et al. |
| 2005/0008141 A1 | 1/2005 | Kortum et al. |
| 2005/0015197 A1 | 1/2005 | Ohtsuji et al. |
| 2005/0015744 A1 | 1/2005 | Bushey et al. |
| 2005/0027535 A1 | 2/2005 | Martin et al. |
| 2005/0041796 A1 | 2/2005 | Joseph et al. |
| 2005/0047578 A1 | 3/2005 | Knott et al. |
| 2005/0055216 A1 | 3/2005 | Bushey et al. |
| 2005/0058264 A1 | 3/2005 | Joseph et al. |
| 2005/0075894 A1 | 4/2005 | Bushey et al. |
| 2005/0078805 A1 | 4/2005 | Mills et al. |
| 2005/0080630 A1 | 4/2005 | Mills et al. |
| 2005/0080667 A1 | 4/2005 | Knott et al. |
| 2005/0131892 A1 | 6/2005 | Knott et al. |
| 2005/0132262 A1 | 6/2005 | Bushey et al. |
| 2005/0135595 A1 | 6/2005 | Bushey et al. |
| 2005/0147218 A1 | 7/2005 | Novack et al. |
| 2005/0169453 A1 | 8/2005 | Knott et al. |

FOREIGN PATENT DOCUMENTS

| | | |
|---|---|---|
| EP | 0 424 015 A3 | 4/1991 |
| EP | 0 424 015 B1 | 4/1991 |
| EP | 0 876 652 A4 | 9/1996 |
| WO | WO 97/26612 | 7/1997 |
| WO | WO 01/37539 A2 | 5/2001 |
| WO | WO 01/37539 A3 | 5/2001 |
| WO | WO 2004/017584 | 2/2004 |
| WO | WO 2004/049222 A2 | 6/2004 |

OTHER PUBLICATIONS

U.S. Appl. No. 10/901,926, filed Jul. 28, 2004.
U.S. Appl. No. 10/901,925, filed Jul. 28, 2004.
U.S. Appl. No. 10/917,233, filed Aug. 12, 2004.
U.S. Appl. No. 10/935,726, filed Sep. 7, 2004.
U.S. Appl. No. 10/999,199, filed Nov. 29, 2004.
U.S. Appl. No. 11/005,498, filed Dec. 6, 2004.
U.S. Appl. No. 11/005,494, filed Dec. 6, 2004.
U.S. Appl. No. 11/010,633, filed Dec. 13, 2004.
U.S. Appl. No. 11/032,495, filed Jan. 10, 2005.
U.S. Appl. No. 10/975,023, filed Oct. 27, 2004.
U.S. Appl. No. 11/036,201, filed Jan. 14, 2005.
U.S. Appl. No. 11/062,100, filed Feb. 18, 2005.
U.S. Appl. No. 11/071,068, filed Mar. 3, 2005.
U.S. Appl. No. 11/086,796, filed Mar. 23, 2005.
U.S. Appl. No. 11/129,051, filed May 13, 2005.
U.S. Appl. No. 11/145,513, filed Jun. 3, 2005.
U.S. Appl. No. 11/173,227, filed Jul. 1, 2005.
U.S. Appl. No. 11/176,972, filed Jul. 7, 2005.
U.S. Appl. No. 11/086,794, filed Mar. 22, 2005.
U.S. Appl. No. 10/996,127, filed Nov. 23, 2004.
U.S. Appl. No. 10/920,719, filed Dec. 13, 2004.
U.S. Appl. No. 10/920,720, filed Aug. 18, 2004.
U.S. Appl. No. 10/948,089, filed Sep. 23, 2004.
U.S. Appl. No. 10/979,784, filed Nov. 2, 2004.
U.S. Appl. No. 11/212,939, filed Aug. 25, 2005.

* cited by examiner

| SYNONYM TABLE | |
|---|---|
| *SPEECH* | *SYNONYM* |
| NEED HELP USING | HOW TO USE |
| I'D LIKE TO GET | ACQUIRE |
| GET OUT OF | CANCEL |
| DISCONNECT | CANCEL |
| I'D LIKE TO KNOW | INQUIRE |
| PROVIDE ME WITH | ACQUIRE |
| GET ME HELP | HOW TO USE |
| HOW MUCH | INQUIRE |

FIG. 4

| OBJECTS | ACTIONS | | | | | |
|---|---|---|---|---|---|---|
| | ACQUIRE | CANCEL | CHANGE | INQUIRE | INFORM | HOW TO USE |
| DSL | X001 | X002 | X003 | X004 | | X005 |
| BASIC SERVICE | X006 | X007 | | X008 | | X009 |
| CALL NOTES | X010 | X011 | | | | X012 |
| CALLER ID | | | X013 | X014 | | |
| BILL | | | | X015 | X016 | |
| PAYMENT | | | X016 | X032 | | X033 |
| OTHER PROVIDERS | | | | X034 | | |
| COUPONS SPECIALS | | | | X035 | | |
| NAME / NUMBER | | | | X036 | | |
| STORE LOCATIONS | | | | X038 | X039 | |
| | | | | | | |

FIG. 5 ers that are configured to process human speech and carry
SYSTEM AND METHOD OF UTILIZING A HYBRID SEMANTIC MODEL FOR SPEECH RECOGNITION

FIELD OF THE DISCLOSURE

The present disclosure relates generally to speech recognition and, more particularly, to a system and method of utilizing a hybrid semantic model for speech recognition.

BACKGROUND

Many speech recognition systems utilize specialized computers that are configured to process human speech and carry out some task based on the speech. Some of these systems support "natural language" type interactions between users and automated call routing (ACR) systems. Natural language call routing allows callers to state the purpose of the call "in their own words."

A goal of a typical ACR application is to accurately determine why a customer is calling and to quickly route the customer to an appropriate agent or destination for servicing. Research has shown that callers prefer speech recognition systems to keypad entry or touchtone menu driven systems.

As suggested above, natural language ACR systems attempt to interpret the intent of the customer based on the spoken language. When a speech recognition system partially misinterprets the caller's intent significant problems can result. A caller who is misrouted is generally an unhappy customer. Misrouted callers often terminate the call or hang-up when they realize that there has been a mistake. If a caller does not hang up they will typically talk to an operator who tries to route the call. Routing a caller to an undesired location and then to a human operator leads to considerable inefficiencies for a business. Most call routing systems handle a huge volume of calls and, even if a small percentage of calls are mishandled, the costs associated with the mishandled calls can be significant.

BRIEF DESCRIPTION OF THE DRAWINGS

FIG. 4 is a table that depicts speech input and mapped synonym terms; and

FIG. 5 is a table illustrating action-object pairs and call destinations relating to the action-object pairs.

DETAILED DESCRIPTION OF THE DRAWINGS

The present disclosure is directed generally to integrating speech enabled automated call routing with action-object technology. Traditional automatic call routing systems assign a correct destination for a call 50% to 80% of the time. Particular embodiments of the disclosed system and method using action-object tables may achieve a correct destination assignment 85 to 95% of the time. In some embodiments, a semantic model may be used to create an action-object pair that further increases call routing accuracy while reducing costs. In particular implementations, the correct call destination routing rate may approach the theoretical limit of 100%. Due to higher effective call placement rates, the number of abandoned calls (e.g., caller hang-ups prior to completing their task) may be significantly reduced, thereby reducing operating costs and enhancing customer satisfaction.

In accordance with the teachings of the present disclosure, a call may be routed based on a selectable action-object pair. In practice, a call is received from a caller and a received speech input is converted into text or "text configurations," which may be the same as, similar to, or can be associated with, known actions and objects. Generally, objects are related to nouns and actions are related to verbs. The converted text may be compared to tables of known text configurations representing objects and actions. A confidence level may be assigned to the recognized actions and objects based on text similarities and other rules. An action-object list may be created that contains recognized actions and objects and their confidence levels. In some embodiments, the entry (action or object) in the list with the highest confidence level may be selected as a dominant item. If an action is dominant a system incorporating teachings disclosed herein may look for a complementary object. Likewise, if an object is dominant, the system may look for a complementary action.

In some implementations, when an action is dominant, remaining actions may be masked and the confidence level of the complementary objects in the action-object list may be adjusted. Conversely, if an object is dominant, the remaining objects may be masked and the confidence level of complementary actions in the action-object list may be adjusted. An adjustment to an assigned confidence level may be based, for example, on the likelihood that the prospective complement in the action-object list is consistent with the dominant entry. Depending upon implementation details, a call may be routed based on a dominant action and a complementary object or a dominant object and a complementary action.

Figure 1:
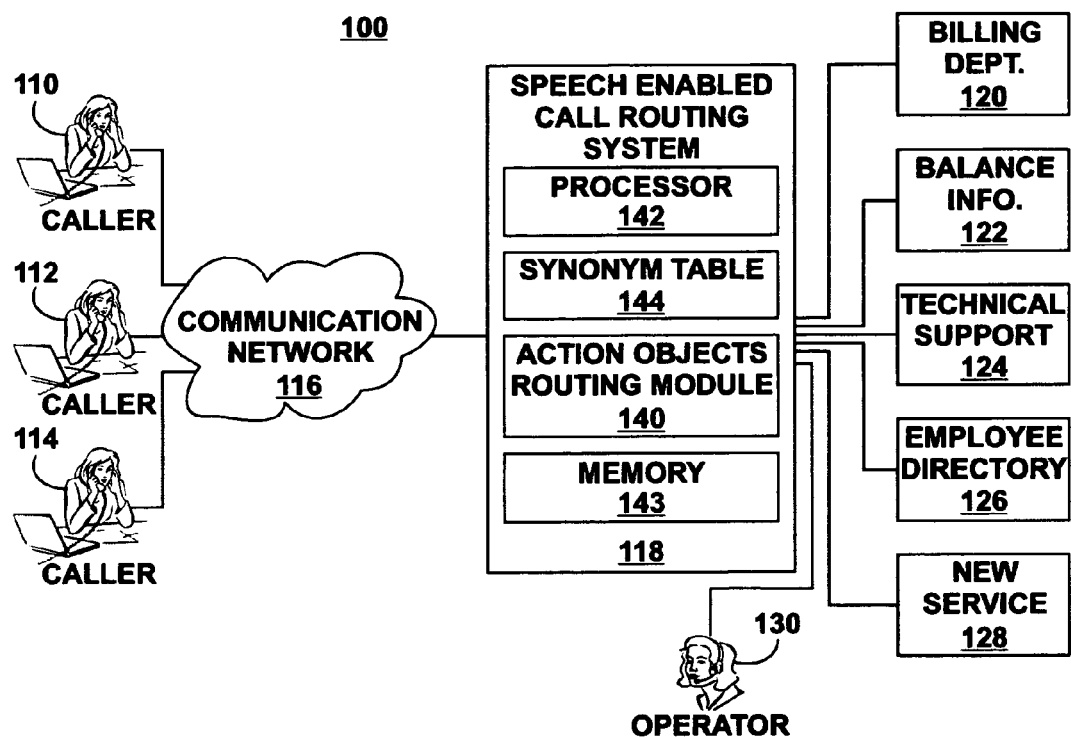
FIG. 1 illustrates a simplified configuration of a telecommunication system.

Referring now to FIG. 1, an illustrated communications system 100 that includes a call routing support system is shown. Communications system 100 includes a speech-enabled call routing system (SECRS) 118, such as an interactive voice response system having a speech recognition module. Communications system 100 also includes a plurality of potential call destinations. Illustrative call destinations shown include service departments, such as billing department 120, balance information 122, technical support 124, employee directory 126, and new customer service departments 128. In practice, communication network 116 may receive calls from a variety of callers, such as the illustrated callers 110, 112, and 114. In a particular embodiment, communication network 116 may be a public telephone network, a wireless telephone network, a voice over Internet protocol (VOIP) type network, or some other network capable of supporting communication. As depicted, SECRS 118 may include components, such as a processor 142, memory 143, a synonym table 144, and a routing module 140. Depending upon implementation details, SECRS 118 may be coupled to and may route calls to various destinations across a LAN, an Intranet, an extranet, the Public Internet, and/or some other communication link or network, as shown. In addition, SECRS 118 may route calls to an agent, such as the illustrated live operator 130.

An illustrative embodiment of SECRS 118 may be a call center having a plurality of agent terminals attached. Thus, while only a single operator 130 is shown in FIG. 1, it should be understood that a plurality of different agent terminals or types of terminals may be coupled to SECRS 118, such that a variety of agents may service incoming calls. Moreover, and as indicated above, SECRS 118 may be operable as an automated call routing system.

Figure 2:
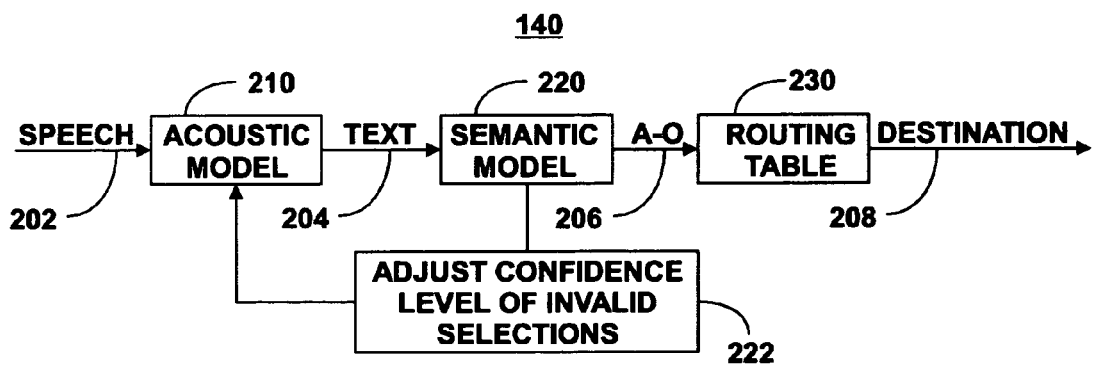
FIG. 2 is a general diagram that illustrates a method of routing calls.

In a particular embodiment, action-object routing module 140 includes an action-object lookup table for matching action-object pairs to desired call routing destinations. This process may be better understood through consideration of FIG. 2. Referring to FIG. 2, an illustrative block diagram of SECRS 118 is depicted. In this particular embodiment, processor 142 in SECR 118 includes an acoustic processing model 210, semantic processing model 220, and action-object routing table 230. In a first conversion, acoustic model 210 may receive speech input 202 and provide text as its output 204. Semantic model 220 may receive text 204 directly or indirectly from acoustic model 210 and produce an action-object table. The action(s) and object(s) in the action-object table may be ordered or ranked according to a confidence level. The confidence level may be used to indicate how likely a given action or object reflects a correct and useable customer instruction.

When a speech input conversion creates a dominant action (e.g., an action has the highest confidence level in the action-object list), a system like SECRS 118 of FIG. 1 may initiate a secondary conversion that creates an object list from the initial speech input. The call may then be routed based on several criteria, such as the overall highest confidence level in the action-object list (a dominant list entry) and the highest confidence level complimentary term from the secondary conversion (a complement to the dominant entry).

In practice, the secondary conversion or a second list can be generated that may take the initial speech received from the caller and processes the initial speech a second time. During the second conversion the semantic model 220 may look specifically for consistent objects while ignoring actions if an action had the highest overall confidence level. In such a case, the high scoring action may have been selected, the actions may have been masked, and objects that are inconsistent with the selected action may be tagged as invalid. Examples of invalid action-object combinations can be understood by referring to FIG. 5, where objects are listed on the left of the chart, and actions are listed across the top of the chart. For example, if the action of "acquire" has the highest confidence level in the action-object list then during the secondary conversion, objects such as "bill," "payment," "other providers," "coupon specials" "name/number" and "store locations" may be masked or tagged as invalid selections.

If the speech input conversion creates a dominant object, a secondary conversion may be initiated to create an action list to assist in selecting a complementary action. The secondary conversion may take the initial speech received from the caller and processes the initial speech a second time. It may also rely on an output from the processing performed in connection with the earlier conversion. During the second conversion, semantic model 220 may look specifically for actions while ignoring objects. The confidence levels of actions may also be adjusted based on actions that are inconsistent with the selected object. Thus, in either case a call may be routed based on a dominant entry and a valid complement to the dominant entry.

The results of a reiterative speech recognition process may be provided to action-object routing table 230. Routing table 230 may receive action-object pairs 206 and produce a call routing destination 208. Based on the call routing destination 208, a call received at a call routing network like SECRS 118 may be routed to a final destination, such as the billing department 120 or the technical support service destination 124 depicted in FIG. 1. In a particular embodiment, the action-object routing table 230 may be a look up table or a spreadsheet, such as a Microsoft Excel™ spreadsheet.

Figure 3:
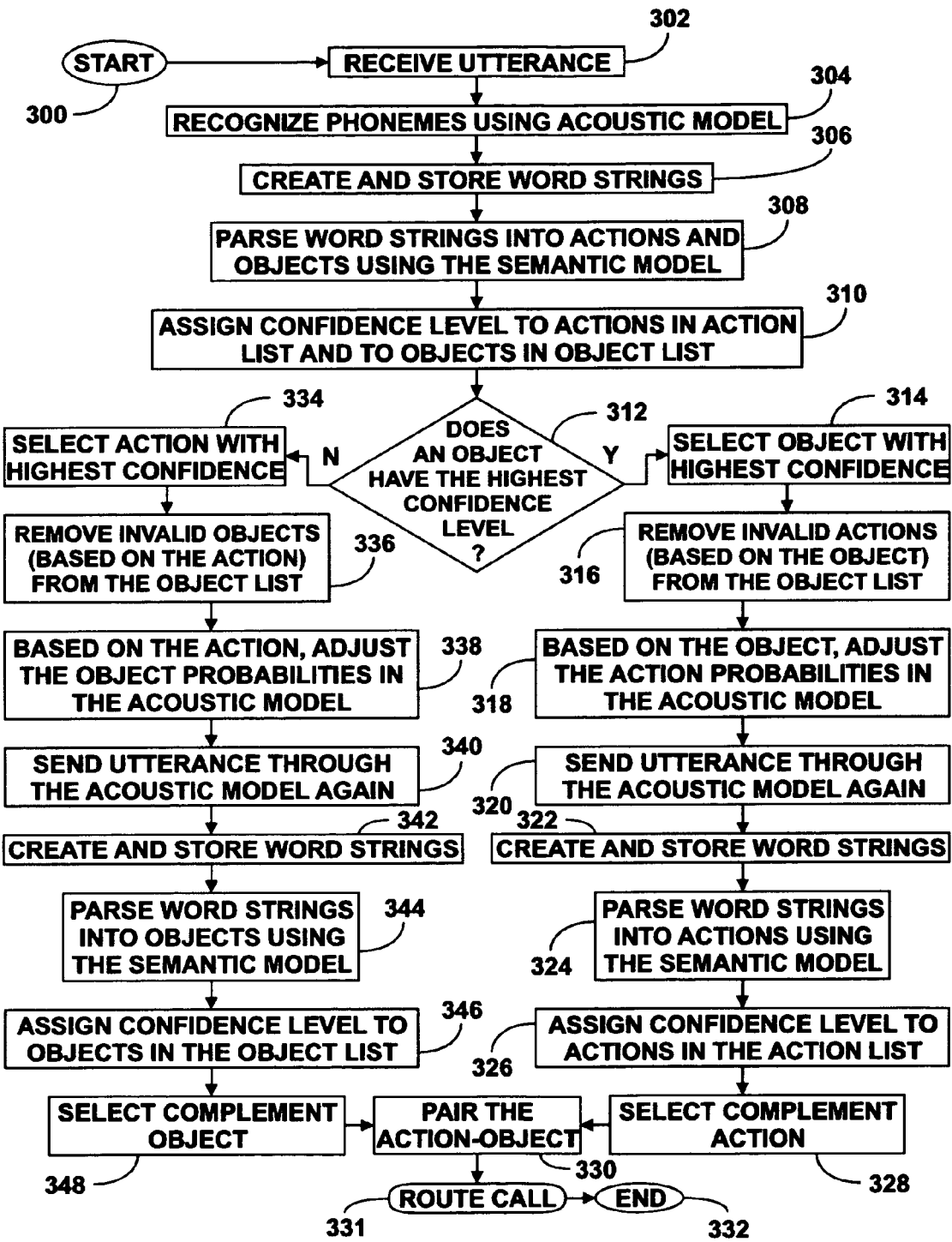
FIG. 3 is a flow diagram that illustrates a method of processing and routing calls.

Referring to FIG. 3, an illustrative embodiment of a method of processing a call using an automated call routing system such as the system of FIG. 1 is illustrated. The method starts at 300 and proceeds to step 302 where a speech input signal, such as a received utterance, is received or detected. Using phonemes or some other effective techniques, the received speech input may be converted into a plurality of word strings or text in accordance with an acoustic model, as shown at steps 304 and 306. In a particular embodiment, probability values may be assigned to word strings based on established rules and the content and coherency of the word string. At step 308, the word strings may be parsed into objects and actions. Objects generally represent nouns and adjective-noun combinations, while actions generally represent verbs and adverb-verb combinations. The actions and objects are assigned confidence values or probability values based on how likely they are to reflect the intent of the caller. In a particular embodiment a probability value or confidence level for the detected action and the detected object is determined utilizing a priority value of the word string used to create the selected action and the selected object.

In some cases, many possible actions and objects may be detected or created from the word strings. A method incorporating teachings of the present disclosure may attempt to determine and select a most probable action and object from a list of preferred objects and actions. To aid in this resolution, a synonym table such as the synonym table of FIG. 4 may be utilized to convert detected actions and objects into actions and objects that the system expects and/or is configured to "listen for." Thus, detected objects and actions may be converted to expected actions and objects and assigned a confidence level. The process may also utilize the synonym table, for example, to adjust confidence levels of the actions and objects. The synonym table may store natural language phrases and their relationship with a set of actions and objects. In practice, natural language spoken by the caller may be compared to the natural language phrases in the table. Using the synonym table, the system and method may map portions of the natural phrases to detected objects and maps portions of the natural spoken phrase to detected actions. Thus, the word strings can be converted into expected objects and actions, at step 308. In summary, at step 310 multiple actions and multiple objects can be detected and provided with a confidence level according to the likelihood that a particular action or object identifies a customer's intent and thus will lead to a successful routing of the call.

The confidence level may be assigned to an action and/or an object based on many criteria, such as the textual similarities, business rules, etc., in step 310. Confidence levels may also be assigned based on a combination of factors, and some of these factors may not involved speech recognition. For example, in a particular example, if a caller does not currently have service, a caller's number (caller ID) may be utilized to assign a high confidence level to the action "acquire" and a low confidence value the actions "change" or "cancel." In the event that a confidence level for an action-object pair is below a predetermined level, the call may be routed to a human operator or agent terminal.

An action-object list may be utilized at step 312 to select a dominant entry. If an action is selected as the dominant entry at step 334, other actions in the action-object list may be masked and objects that are inconsistent with the selected action may be tagged as invalid at step 336. The process of invalidating objects based on a dominant action can be further explained by referring to FIG. 5 where objects are listed on the left side of the chart and actions are listed across the top of the chart. For example if the action of "cancel" has the highest confidence level in the action-object list, the objects described as "bill," "payment," "other providers," "coupon specials" "name/number" and "store locations" may be masked or tagged as invalid selections because a caller would not likely want to, for example, "cancel-store locations." Thus, the method may ignore objects and invalid actions when a dominant object has been selected. The entries at the intersection of valid action-object illustrate routing destinations or phone extension where a call is routed when the system determines a dominant entry and it's complement.

Based on a dominant action, the confidence level of the objects can be adjusted at step 338. The caller's input of the utterance may be sent through the acoustic model, again in step 340, and the acoustic model may create and store word strings, as shown in step 342. Word strings may be parsed into objects using the semantic model in step 344, and an object list may be formed where each object in the list is assigned a confidence level in step 346. When a list is sufficiently complete, the object having the highest confidence level may be selected to complement the dominant action and an action-object pair may be created at step 330.

If at step 312 it is determined that an object has the highest confidence level or is dominant then a search for a complementary action may be conducted. Objects remaining in the action-object list and action that are inconsistent with the selected object may be masked or tagged as invalid, as shown in step 316. Thus such a method may ignore objects and invalid actions in the search for a complementary action when a dominant object has been elected.

Based on the dominant object, the confidence level of listed actions may be adjusted at step 318. The original caller input may be sent through the acoustic model, again in step 320 and the acoustic model may create and store word strings as in step 322. Words strings may then be parsed into objects using the semantic model in step 324 and an actions list may be formed where actions in the list is assigned a confidence level at step 326. The action having the highest confidence level (at step 328) may be selected to complement the dominant object and an action-object pair may be passed at step 330. The call may then be routed at step 331, the process ending at 332.

In practice, it may be beneficial to convert word strings such as "I want to have" to an action such as "get." This substantially reduces the size of the action and object tables. As shown in FIG. 4, differently expressed or "differently spoken" inputs that have the same or similar caller intent may be converted to a single detected action-object, and/or action-object pair. Further, improper and informal sentences as well as slang may be connected to an action-object pair that may not bear phonetic resemblance to the words uttered by the caller. With a mapped lookup table such as the table in FIG. 4, speech training and learning behaviors found in conventional call routing systems may not be required. The tables in the present disclosure may be updated easily, leading to a lower cost of system maintenance. The above-disclosed subject matter is to be considered illustrative, and not restrictive, and the appended claims are intended to cover all such modifications, enhancements, and other embodiments that fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method for processing a call comprising:
   receiving a speech input in connection with a call;
   transforming at least a segment of the speech input into a first textual format;
   generating a first list of entries based, at least partially, on a consideration of the first textual format, the first list comprising at least one action with a corresponding confidence level and at least one object with another corresponding confidence level;
   selecting an entry of the first list having a higher corresponding confidence level;
   outputting a second textual format;
   generating a second list based, at least partially on consideration of the selected entry and the second textual format; and
   suggesting a routing option for the call based on the selected entry and a pairing entry in the second list having a high corresponding confidence level.

2. The method of claim 1, further comprising re-processing the speech input to create an object list when an action is the selected entry.

3. The method of claim 1, further comprising re-processing the speech input to create an action list when an object is the selected entry.

4. The method of claim 2, further comprising:
   including an associated confidence level with an object entry in the object list; and
   selecting an object as the pairing entry based on the associated confidence level.

5. The method of claim 3, further comprising:
   reprocessing the speech input to produce the action list with confidence levels; and
   selecting an action based on the confidence levels in the action list.

6. The method of claim 1, further comprising comparing the first textual format to a list of word strings and assigning a probability to at least one word string included in the list of word strings.

7. The method of claim 6, further comprising assigning an appropriate confidence level to the at least one word string.

8. The method of claim 1, wherein the entry selected is one of a verb and an adverb-verb combination.

9. The method of claim 1, wherein the entry selected is one of a noun or an adjective-noun combination.

10. The method of claim 1, further comprising utilizing a synonym table to assist in converting the speech input into action and objects.

11. A computer readable medium tangibly embodying a program of instructions to manipulate a processor to:
   receive a speech input in connection with a call;
   transform at least a portion of the speech input into a first textual format;
   generate a first list based, at least partially, on a consideration of the first textual format, the list comprising at least one action with a corresponding confidence level and at least one object with its own corresponding confidence level;
   select an entry of the first list having a high corresponding confidence level;
   transform at least some of the speech input into a second textual format;
   generate a second list based, at least partially on consideration of the selected entry and the second textual format, wherein entries in the second list have corresponding confidence levels; and
   suggest a routing option for the call based at least partially on the selected entry and a pairing entry in the second list having a corresponding confidence level above a threshold value.

12. The computer readable medium of claim 11, further including instruction to re-process the speech input to create a list of potential objects to pair with an action when the action is the selected entry from the first list.

13. The computer readable medium of claim 11, further including instructions to re-process the speech input to create a list of potential actions when an object is the selected entry from the first.

14. The computer readable medium of claim 12, further including instructions to produce confidence levels of objects in the object list; and to select an object based on the object list confidence levels.

15. The computer readable medium of claim 13, further including instructions to produce confidence levels of actions in the action list; and to select an action based on the action list confidence levels.

16. The computer readable medium of claim 11, wherein the entry selected is one of a verb and an adverb-verb combination.

17. The computer readable medium of claim 11, wherein the entry selected is one of a noun or an adjective-noun combination.

18. The computer readable medium of claim 11, further comprising instruction to utilize a synonym table to select one of an action and an object.

* * * * *